F. HARRESS.
DEVICE FOR DETERMINING THE SPEED OF AIRCRAFT.
APPLICATION FILED SEPT. 2, 1913.
1,201,580.
Patented Oct. 17, 1916.
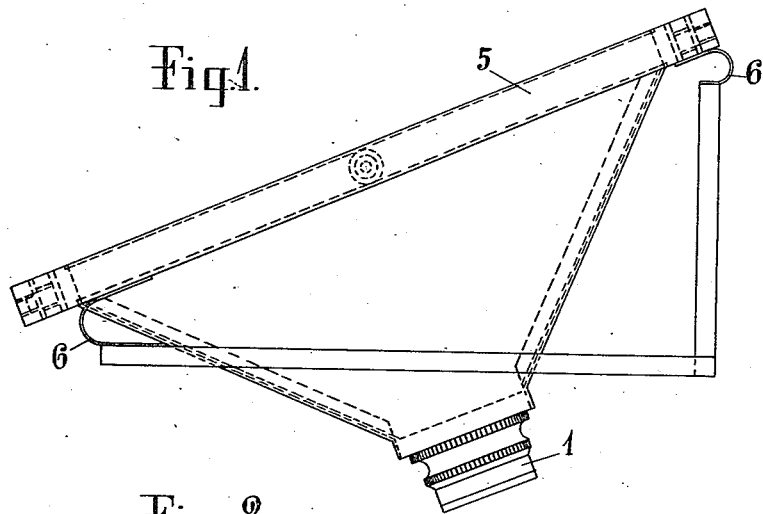
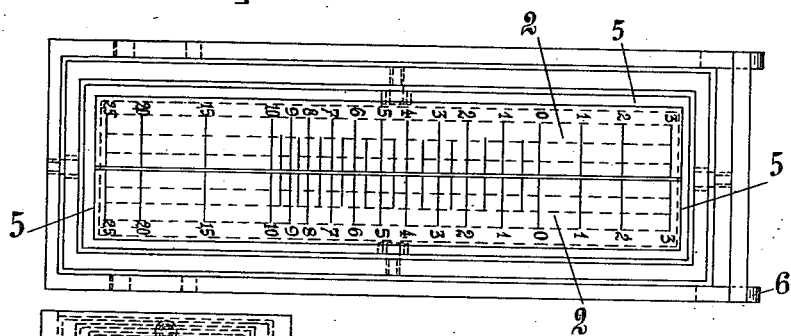
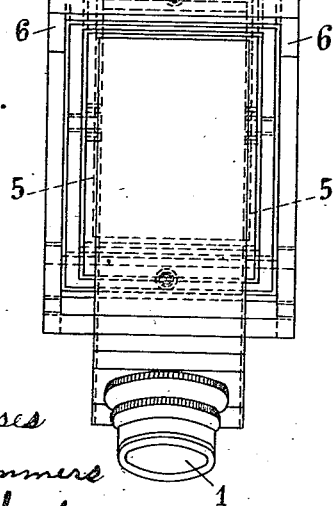
Witnesses
R. Sommers
E. Leckert
Inventor
Franz Harress
By [signature]
atty.

United States Patent Office.

FRANZ HARRESS, OF SCHLEBUSCH, GERMANY, ASSIGNOR TO THE FIRM OF SPRENGSTOFF A. G. CARBONIT, OF HAMBURG, GERMANY.

DEVICE FOR DETERMINING THE SPEED OF AIRCRAFT.

1,201,580.

Specification of Letters Patent.   Patented Oct. 17, 1916.

Application filed September 2, 1913. Serial No. 787,664.

*To all whom it may concern:*

Be it known that I, FRANZ HARRESS, a citizen of Saxe-Meiningen, and resident of Schlebusch, Germany, have invented a new and useful Device for Determining the Speed of Aircraft, of which the following is a specification.

It is known to determine the speed of air crafts in such a way, that the space of time is measured which the picture of a single point of the surface of the earth requires on a matted glass surface, to move a certain distance corresponding to the height of the air ship or aeroplane above the earth, the axis of the optical system being maintained vertically directed.

The present invention refers to a device which is based on this principle and which differs from the devices known heretofore, in that a photographic camera suspended in a universal joint is arranged in such manner, that the optical axis is inclined toward the front in the direction of the movement of the air ship at a constant angle. This is arrived at in such way, that all measurements and corrections of the course necessary for the throwing off or launching of projectiles may be carried out at the mark, without being obliged to adjust the apparatus itself. The inclination of the optical axis moreover has the advantages of enlarging the field of view toward the front, which is of great importance for steering to the object to be aimed at.

Figure 1 of the drawing is a side view. Fig. 2 a plan and Fig. 3 a view of the apparatus from below.

The apparatus which is in the first place destined for aiming when launching projectiles from air crafts consists of a photographic camera, which is suspended in a cardanic or universal joint in such manner, that the optical axis is inclined toward the front in the direction of the moving air ship at about 26°, so that the photographic wide angle lens throws a real picture of the surface of the earth below and in front of the air vessel on the divided matted plate 2. This plate is provided with divisions of such description, that the distances of the surfaces of the earth can be read off from the plate, the height of the air vessel above the earth being taken as unit.

In the mode of construction shown in the drawings that point which is absolutely below the air craft is indicated on the matte or ground glass plate 2, Fig. 2, by zero (0). The scale numerals 1, 2, 3, &c., indicate distances in front of and behind the vertical or zero in multiples of one-tenth of the height of the air craft above the surface of the earth. The numerals to the left of the zero (0) Fig. 2, indicate distances in advance or in front of the craft, while those to the right indicate distances behind the vertical.

For greater accuracy the spaces between the scale divisions may be subdivided in any units desired.

All the divisions correspond to perspective reductions for distance with respect to height. Transversal to this division, that is in the direction of movement of the air vessel, there are on the plate a number of longitudinal lines allowing distances at right angles to the direction of the movement of the air vessel to be ascertained.

The great advantage derived from this arrangement is this, that the aeronaut can see the mark or object to be aimed at in the field of view of the apparatus a long time before approaching the mark and that he can accurately steer to the same without touching the apparatus or adjusting the same in any way. This is done by the aid of the parallel longitudinal lines on the plate, allowing the aeronaut to judge, whether the airship is steering laterally from the aim or not and if so to what extent. Since this can be done a long time before the bomb or grenade has to be launched or cast off, the aeronaut has plenty time to determine the course. Assuming an aeroplane or other air vessel is flying at a height of 1000 m. above the ground at a speed of 20 m. in a second the aeronaut will see the mark in the apparatus on the plate 2.5 km. before arriving at the mark, which distance he will fly through in two minutes. He has therefore plenty time to direct his course exactly toward the mark.

I claim:

Mechanism for ascertaining the speed of air craft for determining the angle for launching projectiles from the latter, comprising an optical system having a universal suspension maintaining the optical axis at a constant angle with respect to the vertical, and a plate arranged in the focal plane of the objective and having perspective longitudinal and transverse divisions parallel and perpendicular respectively to the direction of flight.

DOKTOR FRANZ HARRESS.

Witnesses:
OSCAR DEPNER,
HANS DUMONT.